United States Patent

Yang et al.

[11] Patent Number: 5,975,659
[45] Date of Patent: Nov. 2, 1999

[54] ENCLOSURE FOR COMPUTER SYSTEM

[75] Inventors: Andy K. Yang, Hayward; Phillip Ting, San Jose, both of Calif.

[73] Assignee: Hon Hai Precision Ind. Co., Ltd., Taipei Hsien, Taiwan

[21] Appl. No.: 09/063,881

[22] Filed: Apr. 21, 1998

[51] Int. Cl.[6] ................................................ H05K 5/00
[52] U.S. Cl. ................................... 312/223.2; 312/257.1; 312/265.5
[58] Field of Search ............................. 312/223.1, 223.2, 312/223.3, 265.5, 265.6, 257.1, 263; 361/683, 695, 724

[56] References Cited

U.S. PATENT DOCUMENTS

| | | | |
|---|---|---|---|
| 4,602,829 | 7/1986 | De Andrea | 312/223.1 |
| 4,909,580 | 3/1990 | Mitchell | 312/257.1 X |
| 5,397,176 | 3/1995 | Allen et al. | 312/223.2 |
| 5,491,611 | 2/1996 | Stewart et al. | 361/736 |
| 5,547,272 | 8/1996 | Paterson et al. | 312/223.2 |
| 5,584,549 | 12/1996 | Lybarger et al. | 312/257.1 X |
| 5,713,649 | 2/1998 | Swift | 312/265.5 X |
| 5,735,411 | 4/1998 | Flamme et al. | 312/223.1 X |

*Primary Examiner*—Peter M. Cuomo
*Assistant Examiner*—Stephen Vu

[57] ABSTRACT

An enclosure for a computer system comprises a base frame, a side panel and a bezel. The base frame comprises a top cover, a front panel, a rear panel, a base panel and a tray which forms an open box for receiving subsystems of the computer such as a mother board, a switching power supply, disk drives, a CD ROM etc. The side panel is pivotably mounted to the base frame for covering an opening of the box and is fixed to the rear panel by only one screw. The bezel has locating legs extending through alignment holes of the front panel and the side panel for mounting thereto.

5 Claims, 7 Drawing Sheets

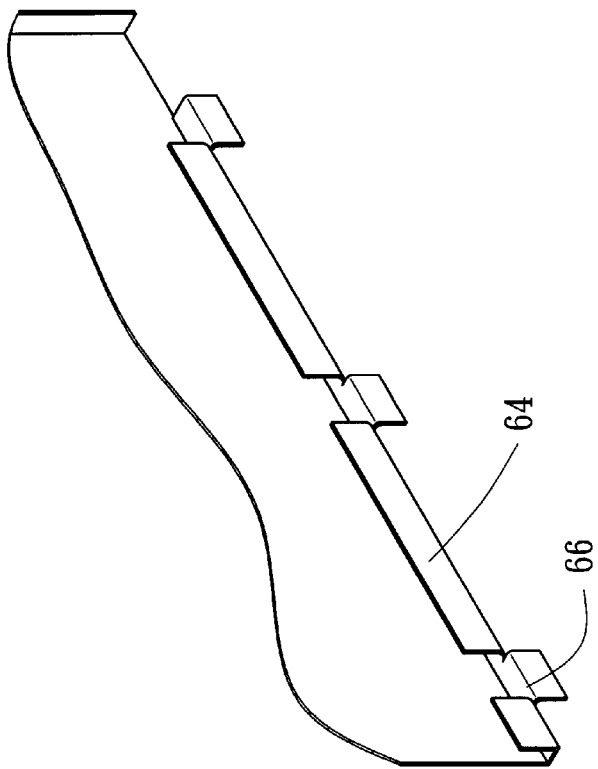
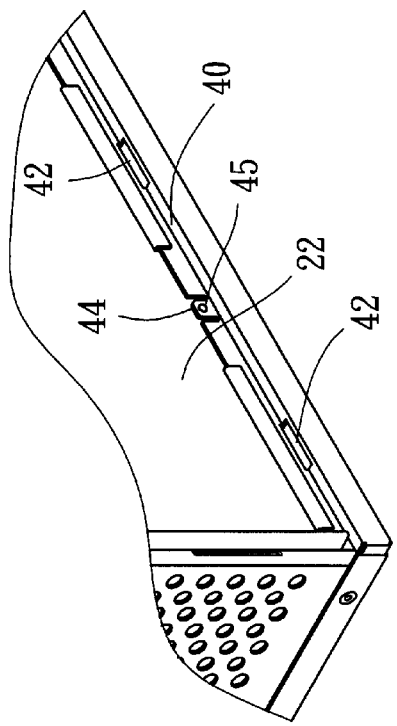
FIG. 2(A)
FIG. 2(B)

ENCLOSURE FOR COMPUTER SYSTEM

BACKGROUND OF THE INVENTION

1. Field of The Invention

The present invention relates to an enclosure for a computer system and, more particularly, to a side panel pivotably mounted and fixed to a base frame of the enclosure with one thumb screw.

2. The Related Art

A conventional computer enclosure used for enveloping subsystems of a computer such as disk drives, a CD ROM, and a switching power supply comprises a base frame, a hood, and a bezel. The base frame comprising a base panel, a front panel, and a rear panel, generally has a U-shaped structure. The hood is also U-shaped having a top panel and two side panels formed along longitudinal sides of the top panel. The base frame forms rails along sides of the base panel for slidably mounting the hood thereto and fixing to the rear panel by screws. The bezel having mounting legs engages with holes defined in the front panel.

There are some problems with the computer enclosure having the structure described above. Firstly, many screws are required for fixing the hood onto the rear panel which not only increases assembly time and manufacturing costs but also complicates disassembly of the computer system when maintenance is required. Secondly, the hood is not easily slid along the rails of the base panel due to the requirement of precise alignment of the rails with sides of the hood and the extended length of the rails. Thirdly, the large dimension of the U-shaped hood occupies a lot of space which complicates storage and transport thereof. The related prior art includes U.S. Pat. Nos. 5,159,528, 5,164,886, 5,271,152, 5,397,176, 5,438,476, and 5,491,611. Thus, the U-shaped hood and base frame require improvement for more convenient assembly and manufacture.

SUMMARY OF THE INVENTION

In view of the foregoing, an object of the present invention is to provide a side panel for facilitating easy and convenient mounting to a computer base frame.

Another object of the present invention is to provide a computer enclosure having a side panel which is easy to store and transport.

To achieve the above objects, an enclosure for a computer system in accordance with the present invention comprises a base frame, a side panel and a bezel. The base frame comprises a top cover, a front panel, a rear panel, a base panel and a tray which forms an open box for receiving subsystems of the computer such as a mother board, a switching power supply, disk drives, a CD ROM etc. The side panel is pivotably mounted to the base frame for covering an opening of the box and is fixed to the rear panel by only one screw. The bezel has locating legs extending through alignment holes of the front panel and the side panel for mounting thereto.

BRIEF DESCRIPTION OF THE DRAWING

FIG. 2(A) is a magnified partial perspective view of FIG. 1 showing a bight of a base panel;

FIG. 2(B) is another magnified partial perspective view of FIG. 1 showing an upward strip and a downward strip of a side panel.

DETAILED DESCRIPTION OF THE PREFERRED EMBODIMENTS

Figure 1:
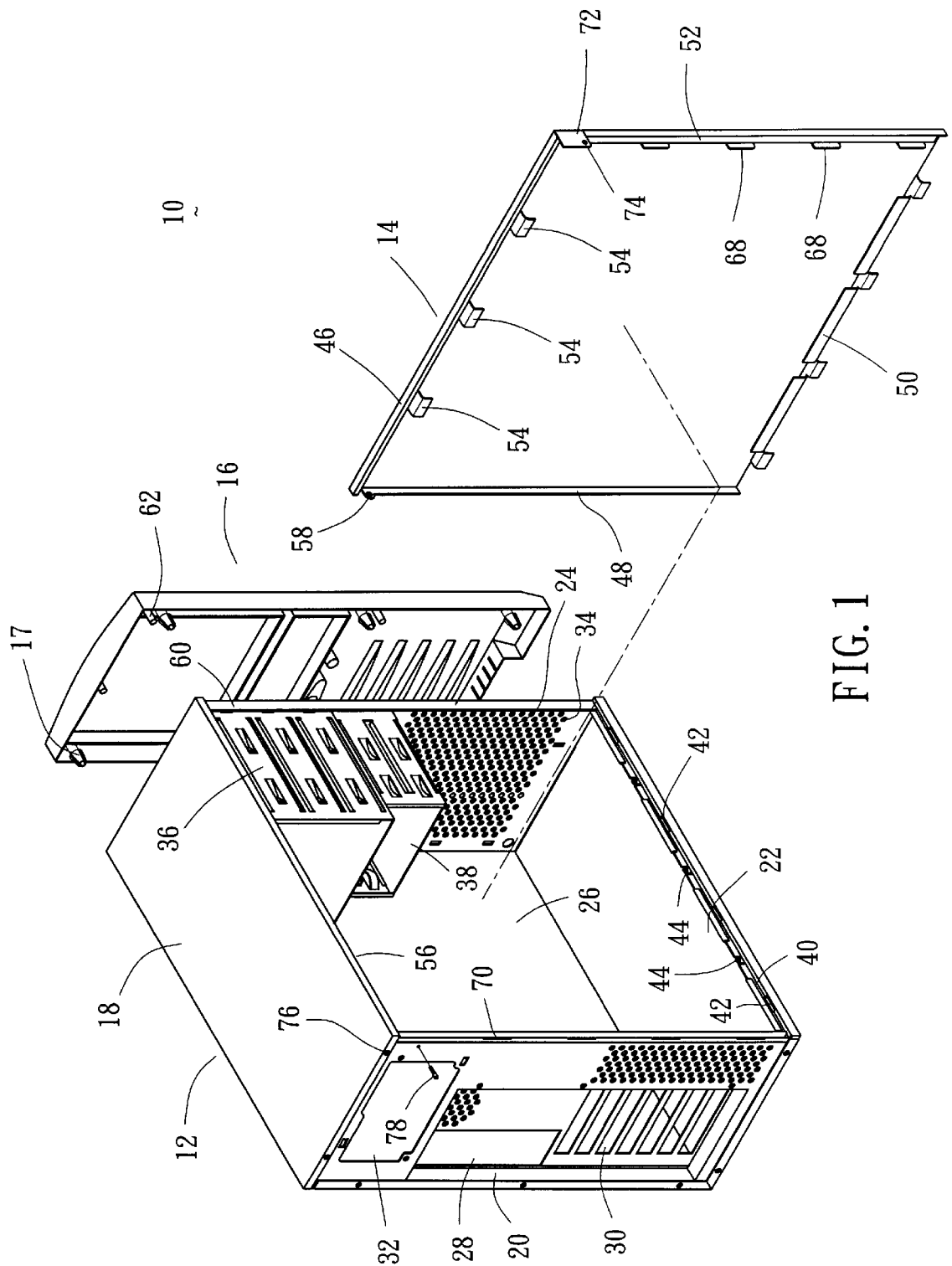
FIG. 1 is an exploded view of a preferred embodiment of an enclosure for a computer system in accordance with the present invention.

Reference will now be made in detail to the preferred embodiments of the present invention. For a better understanding, most of like components are designated by like reference numerals throughout the various figures of the embodiments.

Referring to FIG. 1, a computer enclosure 10 includes a base frame 12, a side panel 14 and a bezel 16 with locating legs 62 and mounting legs 17 for mounting to the base frame 12. The base frame 12 comprises a top cover 18, a rear panel 20, a base panel 22, a front panel 24 and a first side panel 26 serving as a tray for mounting a mother board (not shown) and forming an open box for mounting other subsystems such as disk drives, a CD ROM and a switching power supply. The rear panel 20 defines an I/O area 28 for receiving connectors, slots 30 for insertion of expansion cards (not shown) and an opening 32 for fixing the switching power supply (not shown) thereto. The front panel 24 defines a plurality of vent holes 34 for dissipating heat generated by a CPU (not shown). A 5.25 inch drive cage 36 and a 3.5 inch drive cage 38 are mounted to the front panel 24 for receiving a CD ROM or disk drives (not shown).

Also referring to FIG. 2(A), the base panel 22 has an elongate bight 40 opposite the tray 26. The bight 40 defines slots 42 for mounting the side panel 14 and strips 44. Each strip 44 forms a dimple 45 for connecting to the side panel 14 and providing grounding capabilities.

Figure 3A:
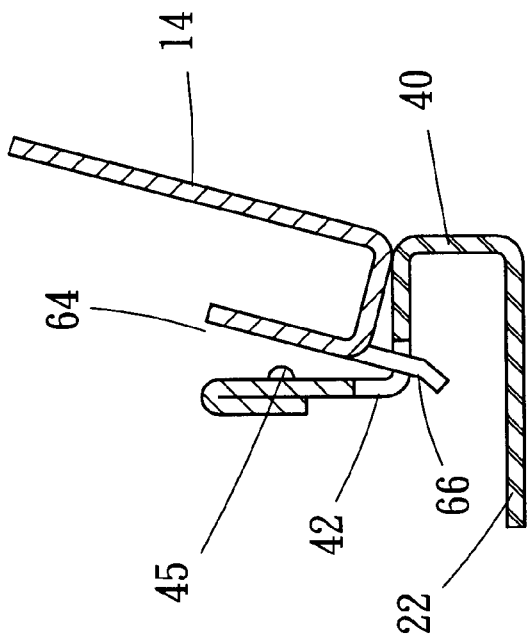
FIG. 3(A) and 3(B) are partial cross sectional views of the referred embodiment in accordance with the present invention showing the downward strip of the side panel inserted into a slot of the base panel.

Referring back to FIG. 1, the side panel 14 includes a top arch 46, a front bend 48, a bottom arch 50 and a rear arch 52. The top arch 46 further forms catches 54 for engaging with an edge 56 of the top panel 18. The front bend 48 further defines a hole 58 in a top portion thereof for alignment with a hole 60 (shown in FIG. 5) defined in the front panel 24. One of the locating legs 62 of the bezel 16 extends through both holes 58, 60 to fix the side panel 14 to the front panel 24. The bottom arch 50 alternately forms upward strips 64 and downward strips 66 as shown in FIG. 2(B). The downward strips 66 are inserted into the corresponding slots 42 of the base panel 22 as shown in FIG. 3(A). The rear arch 52 forms lugs 68 for inserting into corresponding slots 70 defined in the rear panel 20, and a bend 72 with a hole 74 for alignment with a corresponding hole 76 on the rear panel 20 for receiving a thumb screw 78 thereby fixing the side panel 14 to the rear panel 20.

Figure 3B:
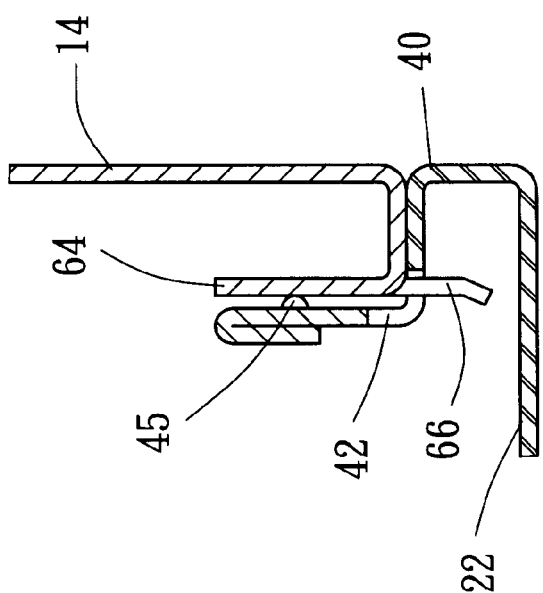
Figure 4:
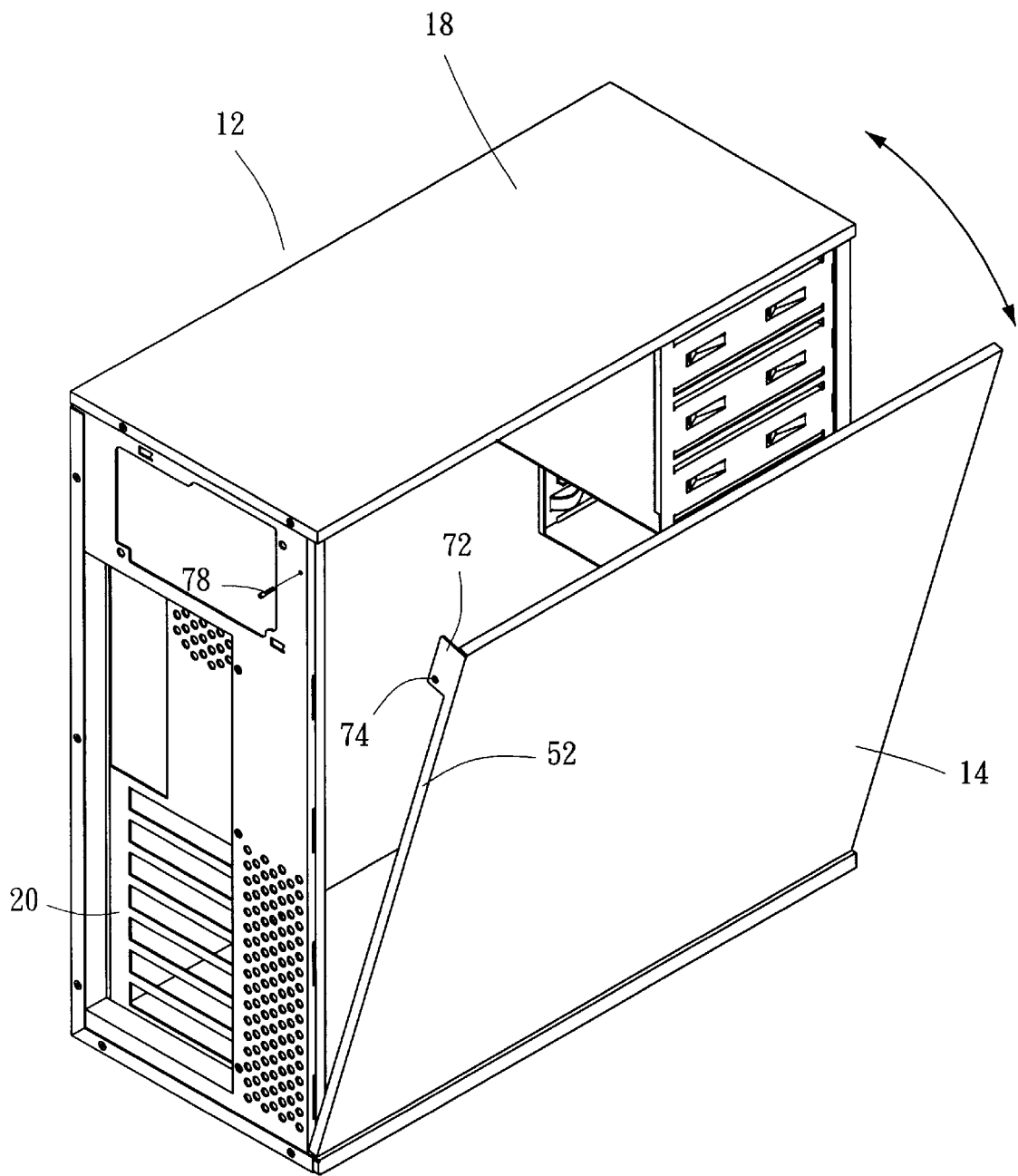
FIG. 4 is a partially assembled rear perspective view of FIG. 1 showing the side panel pivotably mounted to the base frame.
Figure 5:
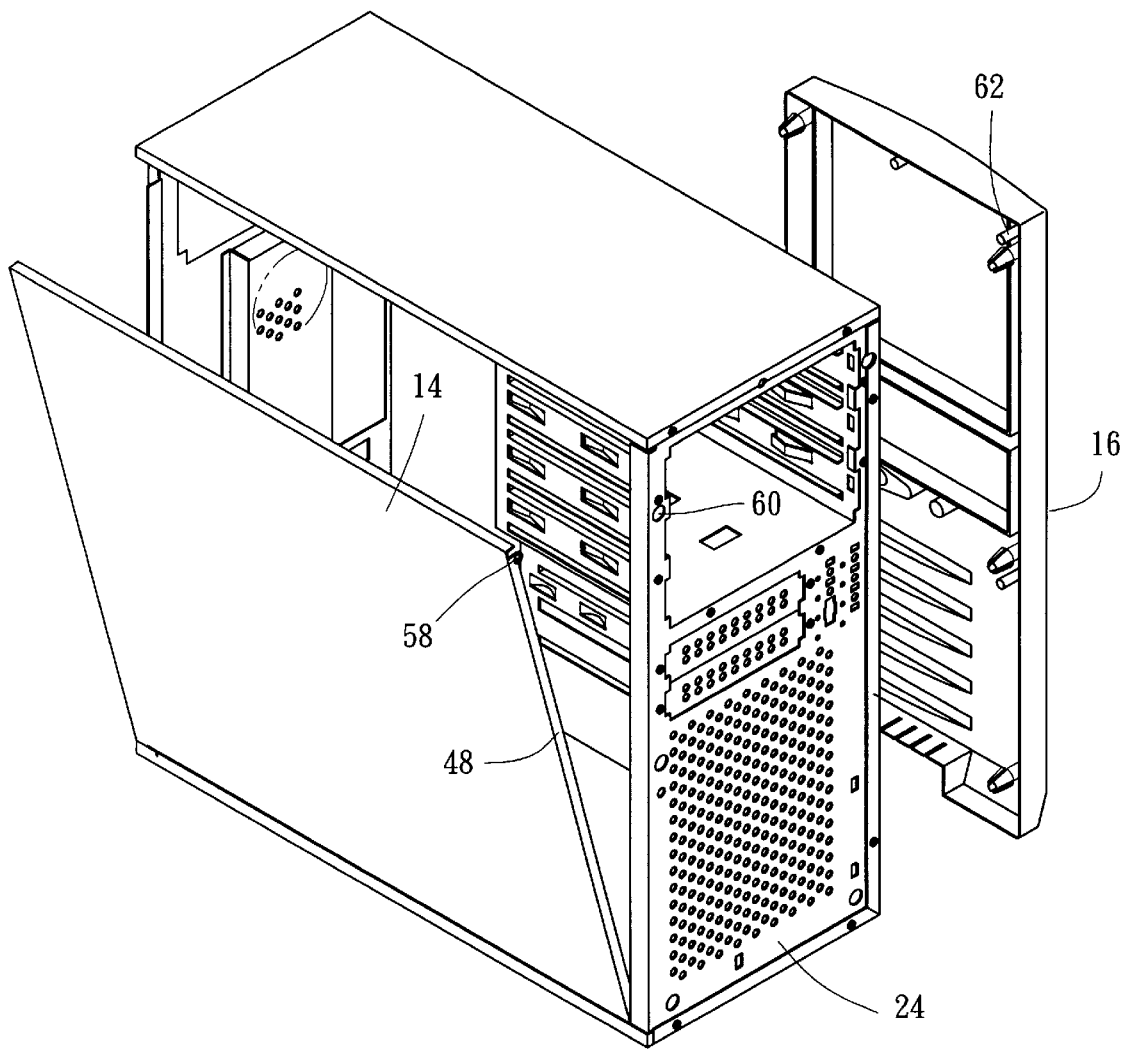
FIG. 5 is a partially assembled front perspective view of FIG. 1.

As shown in FIGS. 3(A) and 4, for mounting the side panel 14 to the base frame 12, the downward strips 66, i.e., a first set of engagement elements, of the side panel 14 are obliquely inserted into the corresponding slots 42, i.e., a second set of engagement elements, of the base panel 22. Then, as shown in FIGS. 3(B) and 4, the side panel 14 is pivoted to abut against the base frame 12 and the dimple 45 of the strip 44 attaches and connects to the upward strip 64. As shown in FIG. 5, the bezel 16 is mounted to the front panel 24 and fixes the front bend 48 of the side panel 14 thereto by the locating leg 62 of the bezel 16. Referring back to FIG. 4, the thumb screw 78 fixes the rear arch 52 to the rear panel 20 thereby securing the side panel 14 thereto.

Figure 6:
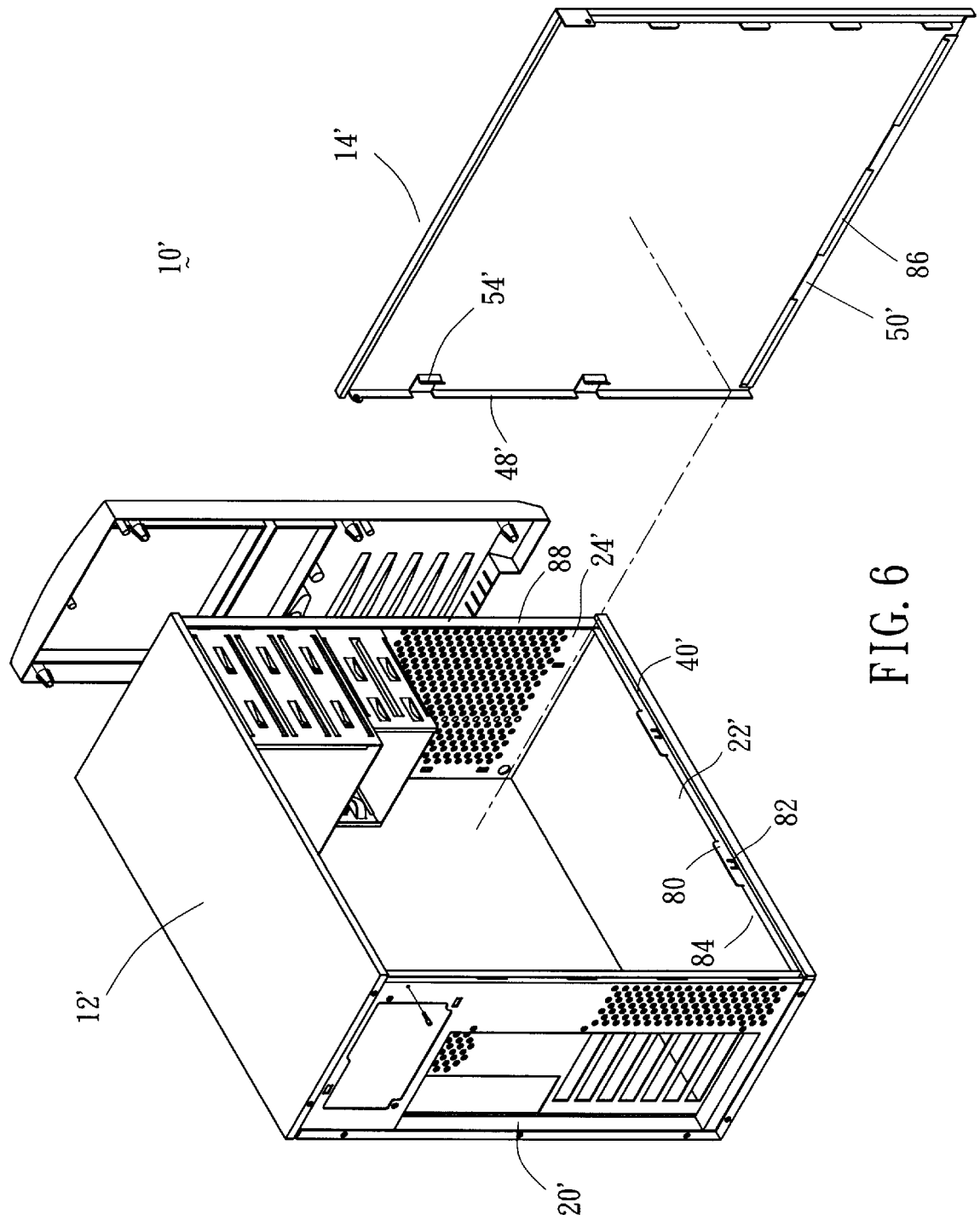
FIG. 6 is an exploded view of a second embodiment of an enclosure for a computer system in accordance with the present invention.

As shown in FIG. 6, the bight 40' of the base panel 22' of the computer enclosure 10' forms recesses 84 and lugs 80 having a strip 82 formed with a dimple (not shown) for contacting the bight 40' and providing grounding capabilities thereto. For mounting the side panel 14', the bottom arch 50' thereof the side panel 14' has clasps 86 for obliquely hooking on the recesses 84 of the base panel 22' and pivoting the side panel 14' to attach to the base frame 12'. The catches 54' of the front bend 48' engage with an edge 88 of the front panel 24' to provide mechanical connection and grounding capabilities.

Figure 7:
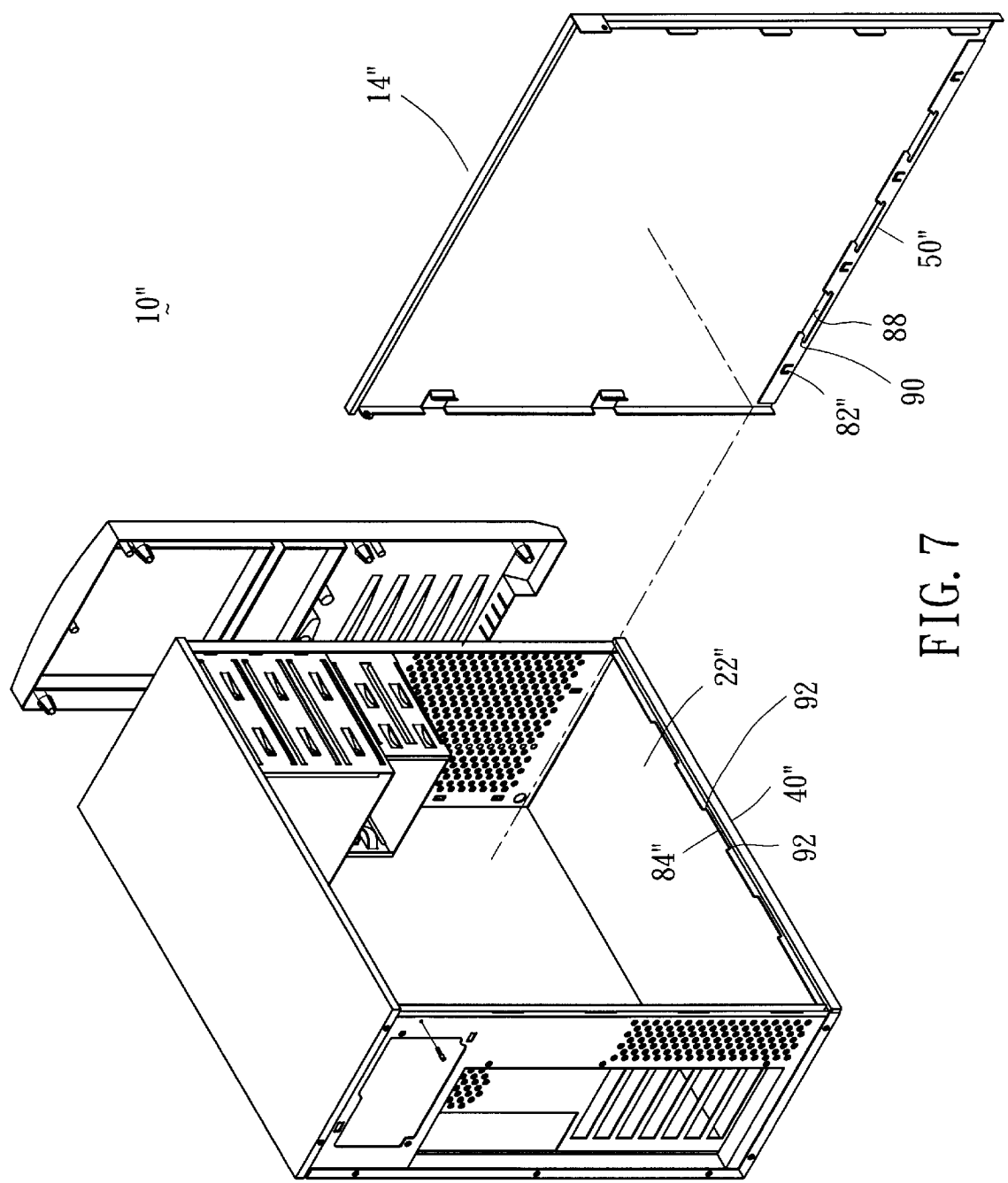
FIG. 7 is an exploded view of a third embodiment of an enclosure for a computer system in accordance with the present invention.

As shown in FIG. 7, the bight 40" of the base panel 22" of the computer enclosure 10" defines recesses 84". The bottom arch 50" of the side panel 14" forms tabs 88 with barbs 90 and strips 82". For mounting the side panel 14", each tab 88 is obliquely disposed in the corresponding recess 84" and each barb 90 engages with two edges 92 of the corresponding recess 84". The spring finger 82" attaches to the bight 40" for providing grounding capabilities.

While the present invention has been described in reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, persons of ordinary skill in this field are to understand that all such equivalent structures are to be included within the scope of the following claims.

We claim:

1. An enclosure for a computer system, comprising:

a frame having a front panel defining at least a first hole and a rear panel opposite said front panel defining at least a second hole;

a bezel having at least one leg for mounting to said front panel;

a side panel pivotably mounted between said front panel and said rear panel, having a third hole aligned with the first hole of said front panel and a fourth hole aligned with the second hole of said rear panel; and at least one screw for fixing the side panel to the frame, wherein the leg of said bezel extends through the first and third holes for locating the side panel onto the frame and the screw extends through the second and fourth holes for firmly securing the side panel and the frame together, and said side panel includes a front bend defining said third hole and a rear bend defining said fourth hole.

2. The enclosure as described in claim 1, wherein said side panel has at least a lug respectively received in a corresponding slot defined in said frame.

3. The enclosure as described in claim 1, wherein said side panel has at least one catch engaging with an edge of said frame.

4. An enclosure for a computer system, comprising:

a frame and a side panel pivotable relative to said frame;

said frame including a base panel defining at least a first engagement element;

said side panel including a second engagement element adapted to be pivotably engaged with the first engagement element; and means for locking the side panel with regards to the frame wherein said means is positioned adjacent to a cover which is opposite to and spaced away from said base panel in a parallel relationship; and wherein said means includes a thumb screw extending through a hole in the side panel and another hole in a rear panel which is substantially positioned between said base panel and said cover.

5. An enclosure for a computer system, comprising:

a frame having a front panel defining at least a first hole and a rear panel opposite said front panel, defining at least a second hole;

a bezel having at least one leg for mounting to said front panel; and a side panel pivotably mounted between said front panel and said rear panel, having a third hole aligned with the first hole of said front panel and a fourth hole aligned with the second hole of said rear panel wherein the leg of said bezel extends through the first and third holes and the second and fourth holes are firmly screwed together, and wherein said side panel includes a front bend defining said third hole and a rear bend defining said fourth hole.

* * * * *